(12) United States Patent
Ishida

(10) Patent No.: US 6,271,297 B1
(45) Date of Patent: Aug. 7, 2001

(54) GENERAL APPROACH TO NANOCOMPOSITE PREPARATION

(75) Inventor: Hatsug Ishida, Shaker Heights, OH (US)

(73) Assignee: Case Western Reserve University, Cleveland, OH (US)

(*) Notice: Subject to any disclaimer, the term of this patent is extended or adjusted under 35 U.S.C. 154(b) by 0 days.

(21) Appl. No.: 09/311,132

(22) Filed: May 13, 1999

(51) Int. Cl.⁷ .................................. C08K 3/34; C08K 7/16

(52) U.S. Cl. ........................ 524/445; 524/447; 523/223

(58) Field of Search .................................. 524/445, 447; 523/223

(56) References Cited

U.S. PATENT DOCUMENTS 6,057,396 * 5/2000 Lan et al. .............................. 524/445

* cited by examiner

Primary Examiner—Kriellion Sanders
(74) Attorney, Agent, or Firm—Hudak & Shunk Co., L.P.A.

(57) ABSTRACT

A blend of a polymer, swelling agent, and a sheet silicate and/or sheet silicone filler is disclosed. The swelling agent makes it possible to intercalate the sheet silicate and/or sheet silicone with a variety of different polymers. The swelling agent is a material with sufficient mobility such that it can enter between the sheets of the silicate or silicone and increase the spacing between sheets. The swelling agent desirably has a solubility parameter that facilitates entry of both the swelling agent and matrix polymer between the layers of the filler promoting intercalation and/or exfoliation.

13 Claims, No Drawings

GENERAL APPROACH TO NANOCOMPOSITE PREPARATION

This invention was made with U.S. government support under sponsor award #EEC91-08700 from the National Science Foundation. The government has certain rights in the invention.

FIELD OF INVENTION

The field is the preparation of nanocomposite compositions from matrix polymers and platelike silicate or silicone fillers to form intercalates and/or exfoliated fillers. The general approach is applicable to a wide variety of polymers. They can typically form both intercalates and exfoliates of the fillers through the use of a small amount of a swelling agent which can enter into the spaces between the platelets of the filler and compatibilize the filler with most matrix polymers. Swelling agents are generally small mobile molecules, oligomer, and/or polymers with good compatibility toward the silicate filler or silicone filler with or without cation exchange.

BACKGROUND OF THE INVENTION

There is strong interest in nanocomposites due to the opportunity to prepare compositions with improved properties over those of the starting polymers through controlling the size and dispersion of fillers therein. Silicate fillers (many of which are mined and require only minimal processing before use) are available that include within each particle a multitude of platelike layers. During most conventional polymer processing steps the individual plates do not separate but rather the aggregates of many platelike layers are dispersed as a single particle. Some authors have found ways to pretreat silaceous fillers (often using the monomeric form of the matrix polymer) to cause intercalation and exfoliation with specific polymers.

Nanocomposites from nylon in the prior art exhibited substantial improvement in mechanical, thermal and Theological properties. Nanocomposites from epoxies exhibited improved tensile modulus and strength. Suspension of a sheet silicate in solvents such as water, acetonitrile, dimethyl acetamide (DMAC) has resulted in intercalated hybrids of poly(ethylene oxide). Melt methods have lead to the intercalation of polystyrene and exfoliated nanocomposites of epoxy via melt interlayer polymerization. Interlayer polymerization has also produced intercalated polystyrene, intercalated poly(ε-caprolactone), and poly-6-amide by intercalation of ε-caprolactam. Other approaches such as sol-gel process and monomer/polymer grafting to clay layers have also resulted in polymer clay hybrids.

Using an oligomeric form of the matrix polymer as an additive, allows the additive to swell the clay. For example Okada et al. have reported using a polyolefin oligomer with polar telechelic hydroxyl groups to prepare a polypropylene clay hybrid.

SUMMARY OF THE INVENTION

A process for preparing nanocomposites from fillers having platelike structure and a variety polymers is disclosed. The process often uses a surface modifying agent or surfactant exchanged for cations on the filler and uses a swelling agent that enters between the platelets of the inorganic filler facilitating both intercalation with a polymer and/or exfoliation of the platelets. The universality of the approach greatly expands the list of matrix polymers that can be used in nanocomposites with platelike fillers. Preferred swelling agents include caprolactam, epoxy monomers and/or oligomers and vinyl monomers. By varying the 1) amount of swelling agent, 2) the mixing sequence, 3) the swelling agent, and/or 4) other variables one can form various nanocomposites (e.g. intercalated clay and/or exfoliated clay) with predominantly intercalated or exfoliated platelets. A swelling agent can function either as an intercalation agent or as an exfoliating agent. Preferred inorganic fillers include clay. Preferred swelling agents include low molecular weight epoxy compounds. Preferred matrix polymers include polyolefins, polydiolefins, polycarbonates, polyesters, poly(alkyl)acrylates, poly(vinyl chloride), poly (vinyl acetate), nylons (polyamides), copolymers including repeating units from diolefins, and poly(styrene-acrylonitrile). The process does not require any complex equipment as intercalation and exfoliation can occur during simple mixing operations. The evidence of intercalation into the clay or exfoliation of the clay (both of which will be called nanocomposite formation) is a shift in or the absence of x-ray powder diffraction patterns from the clay.

Those skilled in the art have characterized fillers as either simple fillers or reinforcing fillers depending upon whether they were added to simply fill volume in a polymer composite (simple filler) or they increase one or more physical properties over that of the basic polymeric component (reinforcing fillers e.g. carbon black). Unfortunately sheet silicates have been typically considered as simple fillers since there is usually 1) little bonding between the sheet silicates and the polymer, 2) the amount of surface interaction between the silicate and the polymer is low because a macrocomposite is formed with large domain sizes, and 3) the sheet silicate is easily delaminated under high stress. The nanocomposite technology can make sheet silicates function as reinforcing fillers as it 1) increases the surface interaction and bonding between the silicate and the polymer especially when the polymer is intercalated into the silicate, 2) increases dramatically (by a factor of 10, 100, or 1000 or more) the surface contact between the sheet silicate and the polymer by intercalating polymer into the silicate or exfoliating the silicate, and 3) reduces the possibility of composite failure due to simple delamination of the sheet silicate. Nanocomposites are a combination of two or more phases, where at least one of the phases has at least one dimension in the nanoscale regime. The technology is different from the prior art in that the swelling agent is always different than the matrix polymer of the nanocomposite.

DETAILED DESCRIPTION OF THE INVENTION

The polymers useful in this invention include a variety of thermoset and thermoplastic polymers. Some polar polymers such as nylons may, with sufficient shear, tend to exfoliate silicate fillers without a swelling agent. The non-polar polymers like the polymers from monoolefins, conjugated dienes, and vinyl aromatic monomers are generally incapable of intercalation into the clay interior in simple blends of clay and polymer. Preferred polymers include those typically processed above their glass transition temperature or above their melting point with traditional extruding, molding, and pressing equipment. These are rubbers and thermoplastics. Preferred polymers for some embodiments are those that are incapable of intercalating or exfoliating more than 5 or 10 weight percent of said fillers without the swelling agent. The polymers from monoolefins include those polymers from one or more olefin monomers having from 2 to 10 carbon atoms such as polypropylene, polyethylene, isobutylene polymers, EPDM rubber etc. The polymers from monoolefins can include repeating units from nonolefin monomers. The polymers from conjugated dienes include those from dienes having from 4 to 8 carbon atoms including halogenated monomers such as chloroprene and copolymers, terpolymers etc. which have at least 20, 30, or 50 wt. % repeating units from conjugated dienes such as styrene-butadiene copolymers. The polymers from vinyl aromatic monomers include those from styrene or various alkylated styrenes having from 8 to 12 carbon atoms and any copolymers, terpolymers, etc. having at least 20, 30, or 50 wt. % repeating units from said vinyl aromatic monomers such as styrene-acrylonitrile copolymers. Other polymers include polyesters generally from diacids having from 3 to 20 carbon atoms and diols having from 1 to 20 carbon atoms such as poly(ethylene-terephthalate); polyesters from the ring opening polymerization of cylic esters having from 2 to 5 or 6 carbon atoms; poly(vinyl alcohol); polyacetal; poly (vinyl acetate); poly(alkyl)acrylates from (alkyl) acrylates having from 3 to 30 carbon atoms; poly(vinyl chloride); poly(vinylidene chloride); polytetrafluoroethylene; copolymers of any of the monomers; polycarbonates from things such as phosgene and diols having from 1 to 20 carbon atoms; polyamides from diacids having from 3 to 20 carbon atoms and diamines having from 1 to 20 carbon atoms or from ring opening of caprolactams; polyethers having from 1 to 6 carbon atoms per repeating unit; fluorinated polymers; and polysiloxanes.

Desirably the matrix polymer component is present from about 30 to about 99 weight percent of the blend of polymer, swelling agent, and sheet silicate (e.g. clay) or sheet silicone (e.g. organosilicone sheet polymer derived from natural silicates), more desirably from about 30 or 35 to about 94.5, and preferably from about 55 to about 94 weight percent.

The sheet silicate or sheet silicone can be any sheetlike filler having a high percentage of silicon atoms. Desirably the total $SiO_2$ content is at least 30, 40, or 50 weight percent of the filler. Sheetlike fillers for the purpose of this application will desirably have a thickness per sheet of about 1 to about 30 nanometers. A preferred sheetlike filler is clay. Sheetlike fillers desirably have intersheet spacings that can be determined by x-ray diffraction before they are exfoliated. Clay is a hydrated aluminum silicate comprised of multiple platelets. It is a component of soils typically derived from the weathering of rocks. Desirably the clay aggregate has particle sizes of less than 200 microns, more desirably less than 100 microns and preferably less than 50 microns. It can be various colors including red browns to pale buff. It is insoluble in water and most organic solvents. Typical types include kaolinite, montomorillionite, stapulgite, illite, bentonite, and halloysite. The clay may be chemically modified or otherwise modified including functionalized clay. Other sheetlike silicates include mica.

Desirably the sheetlike filler is present in an amount from about 1 to about 70 weight percent of the blend of matrix polymer, swelling agent, and sheet silicate or sheet silicone, more desirably from about 5 to about 50, and preferably from about 5 to about 30 weight percent.

Swelling agents are chemical compounds that facilitate the entry of the matrix polymer into the layers of a sheet silicate or sheet silicon. A swelling agent can also function as either an intercalation agent or an exfoliating agent. An exfoliation agent is something that facilitates increasing the spacing between sheets to such a large extent that the sheets lose all orientation with respect to each other or the intersheet distance becomes random even if sheet orientation is somewhat retained. The swelling agents desirably are somewhat polar, as the environment between the sheets is somewhat polar unless modified with silanes or another surface treatment. If a nonpolar surfactant such as fluorinated amine is used to treat the platelike filler then a nonpolar swelling agent such as fluorinated epoxy can be used to intercalate or exfoliate the filler. Examples of swelling agents include epoxy monomers and caprolactam. Swelling agents can be monomers, dimers, trimers, or oligomers of 4 or more repeating units. They may be polymers with a number average molecular weight of less than 2,000 but could be up to 100,000. They may have functional groups so that they can be polymerized or reacted to other components including the polymer and the sheet silicate or silicone. A preferred embodiment is where the swelling agent is or can be converted to a polymer that interacts favorably with the matrix polymer or is a plasticizer for the matrix polymer component. An example is dioctyl phthalate (DOP), epoxidized linseed oil (ELO), etc. For the purposes of this application, the swelling agent is other than the monomer used to form the matrix polymer or an oligomer from the same monomer used to form the matrix polymer. Low molecular weight solvents such as water, acetonitrile, dimethylacetamide (DMAC), etc., which evaporate from the nanocomposite in a short time should be avoided. For the purpose of this application solvents will be defined as compound(s) having a vapor pressure of 750 mm of Hg or more at 100° C. and compounds which are not readily polymerizable in a conventional mold with catalysts or initiator at a temperature from 20 to 100° C. For the purpose of this application swelling agents will be defined to be other than these readily volatile solvents that do not polymerize or otherwise become part of the nanocomposite.

Desirably the swelling agent is present in an amount from about 0.01 or 0.05 to about 50 weight percent of the blend of matrix polymer, swelling agent, and sheet silicate or sheet silicone, more desirably from about 0.5 or 1 to about 10, 15 or 20, and preferably from about 1 to about 15 weight percent.

Intercalating is defined as when something is inserted between the platelets or layers of an existing material. When a material is intercalated between the platelets, e.g. platelets of clay, it generally means the material is inserted between the layers generally uniformly such that the average distance between the platelets of the clay as measured by x-ray diffraction is increased a measurable amount. Intercalation, due to the uniformity of the insertion, desirably does not significantly increase the breadth of the distribution of spacing between the clay platelets, e.g. by a factor of 5 or less or 2 or less. This is different than exfoliation, which randomizes the spacing and/or orientation of the clay platelets. Exfoliation increases the spacing between the exfoliated layers such that the forces that hold the platelets a uniform distance from each other are easily overcome by the interaction with the matrix material and the shear forces applied.

Exfoliation refers to casting off in scales, laminae, or splinters or to spread or extend by or as if by opening out leaves. With respect to clay it refers to separation between platelets, which proceeds to such an extent that the orientation and/or separation between the platelets become random. Thereafter the platelets, which were exfoliated, act as individual entities rather than a group of entities functioning together due to orientation. Exfoliation need not be complete and is often expressed as the percentage of material, which has become randomly distributed with respect to other platelets of the same material.

Desirably the intercalation results in an increase of at least 5% and more preferably at least 10, 20, or 30% in the average spacing between the platelets as determined by x-ray diffraction. Desirably the exfoliation results in at least 5 wt. % and more desirably at least 10, 20, 40, or 50 wt. % of the clay being dispersed as individual platelets. Desirably the solubility parameter of the swelling agent is a value such that the swelling agent facilitates the above increases in the intercalating and extent of exfoliation over a control without the swelling agent.

It is desirable to treat the sheet silicate or sheet silicone to exchange any metallic cations such as $Na^+$ or $K^+$ with organic cation to increase the organophiliciy of the silicate layer unless the swelling agent is known to swell silicate layers without such treatment. This lowers the surface energy and improves wetting with the polymer matrix. By selecting different surface modifying agents e.g. silanes or surfactants (e.g. amines) one can optimize the surface of the sheet silicate for the best interaction with the swelling agent and matrix resin. The ion-exchanged clay can be more easily dispersed in an organic matrix to form an intercalated or exfoliated composite. Organic cations may be amines or polyamines with from 1 or 2 to 20 or 100 carbon atoms.

Another component that may be present is silanes e.g. silane treating or coupling agents. Silane coupling agents are chemical compounds that have at least one silicon atom and at least two functional groups. Said functional groups include at least one that can react with a first chemical compound (e.g. clay) and at least one that can react with a different second chemical compound (e.g. matrix polymer) coupling them together. Silane treating agents would generally have at least one functional group reactive with a single chemical compound. Thus silane treating agents just modify a surface of a single chemical compound, e.g. a clay filler, making the surface more compatible with another chemical compound (e.g. matrix polymer). Silane coupling and treating agents are well known to the art and are often used to compatibilize or couple polymers with various fillers, fibers, etc.

The polymer, swelling agent and the sheet silicate or sheet silicone can be mixed or blended together in a variety of ways depending upon the desired amount of intercalation and/or exfoliation. For example the sheet silicate can be mixed with the swelling agent to start intercalation and the polymer can be added later to cause further intercalation or exfoliation. The swelling agent may be mixed with the matrix polymer forming a blend and then that blend can be mixed with the sheet silicate. Another option is that the matrix polymer and the sheet silicate can be blended and then the swelling agent added. The matrix polymer in any of the above steps can be in the form of a high viscosity liquid or as a partially or fully crystalline material. For best physical properties of the blend, the polymer is heated above its crystalline melting point or above its glass transition temperature at some point in the mixing process. As shown in the examples the compatibility of the matrix polymer, swelling agent, and the sheet silicate or sheet silicone for each other may also suggest or necessitate alternate mixing procedures.

As described in the Summary of Invention nanometer thickness fillers such as intercalated sheet silicates and exfoliated sheet silicates are believed to have unique properties due to the size and shape of the fillers along with enhanced interaction with the polymer due the swelling agents. The sheetlike fillers, which have a thickness in the nanometer range, generate a tremendous amount of surface area per gram when subjected to intercalation or exfoliation. If the interaction and/or bonding between the filler and the matrix polymer (resin) is favorable then the filler can stiffen the nanocomposite and increase its strength and other physical properties. Favorable interaction is defined for the purpose of this application as interaction that causes either intercalation or exfoliation of the filler. If the interaction between the filler surface and the matrix polymer is weak and/or the filler is dispersed as large particles, the filler can act as nucleation sites for failure, due to the filler acting as a defect or as a stress concentrator. Unfavorable interaction is defined as when neither intercalation nor exfoliation occurs. Nanometer thickness fillers would generally be much too small to act as a defect in most tests. Good interaction at the filler surface with the polymer would further preclude failure at the filler to polymer interface.

EXPERIMENTAL

Bentolite-L, hydrated aluminum silicate, bentonite, clay was obtained from Southern Clay Products. Epoxy resin, EPON 825 was obtained from Shell, and 12- aminododecanoic acid and hexadecylamine were purchased from Aldrich.

The protonated form of 12-aminododecanoic acid was prepared by dissolving the amine (1.07 g, 0.05 M) in 0.05 M HCl solution at 60° C.

Bentolite clay (5 g) was dispersed in the solution and the resultant mixture was stirred at 60° C. for 1.5 h. The solution was filtered and thoroughly washed with water heated to 60° C. The clay (B12) was then dried overnight in a vacuum oven at 100° C. The same procedure was used with clay that was ion exchanged with hexadecylamine (B16).

The technique used for nanocomposite preparation was melt mixing. The amounts of polymer, clay, and epoxy were 0.88 g, 0.1 g, and 0.02 g respectively unless otherwise stated. Each polymer was heated above its softening or melting point, then the clay and epoxy were added, and the mixture was manually stirred for 30 min. When stirring, the sample was actually sheared or "kneaded" with a spatula or a pestle. The same procedure was followed using 0.90 g of polymer and 0.10 g clay, to attempt to prepare nanocomposites in the absence of epoxy. Hybrid formation as a function of reaction rate and time was demonstrated mechanically by mixing in a Banbury mixer or Brabender Plastocorder the components comprising polyethylene, 2 weight percent epoxy and 5 weight percent of clay (B12) at speeds of 40 and 60 rpm for periods of time from 5 minutes to about 4 hours . This experiment was repeated using hexadecylamine (B16) in lieu of aminodecanoic acid (B12). Experiments using polyethylene as the matrix polymer and 2 wt. % epoxy using a Brabender Plastograph type mixer showed a dependence on both rpm and mixing time. At 40 rpm an original clay diffraction peak was still present after 10 minutes however at 60 rpm the same peak was absent after 10 minutes.

Nanocomposites prepared from poly(isobutylene), poly (butadiene), poly(1 -butene), and poly(isoprene) were heated at 140 ° C. in a vacuum oven overnight in addition to stirring for 30 minutes.

Thermogravimetric Analysis, TGA, experiments were carried out using a TA Instruments 2950 Thermogravimetric Analyzer. The experiments were performed under nitrogen purge with a flow rate of 90 mL/min. A heating rate of 10° C./min from room temperature to 810° C. was used, unless otherwise mentioned.

X-ray powder diffraction patterns were examined using a Philips X-ray Diffractometer. The experiments were carried out in the reflection mode using CuK radiation and a scanning speed and step size of 0.3/min and 0.05° respectively. A diffraction angle, 2θ, from 2° to 32° was used.

Transmission electron microscope (TEM) specimen were microtomed and micrographs were obtained using a JEOL: JEM 100 SX with a 100 kV accelerating voltage. The micrographs confirmed the x-ray determination of exfoliation.

Selective exfoliation with an epoxy monomer can only be proven by adding the monomer to polymers that otherwise will not exfoliate the clay. Therefore, attempts were made to exfoliate clay layers using only each polymer. If these materials alone could not exfoliate the clay, 2 wt. % of epoxy was added.

The reaction of epoxy with the ion exchanged clay results in the polymerization of the epoxide and the resultant exfoliation of the clay. This polymerization/exfoliation is seen as a liquid-powder transformation of the epoxy. At ambient temperature the unintercalated clay particles are suspended in the liquid epoxy. The epoxy monomers solvate and swell the organoclay galleries at 75° C. retaining the liquid like suspension of clay. With increasing temperature the intercalated epoxy monomers undergo self polymerization by a catalytic reaction with the acidic protons associated with the alkylammonium cation. Gel formation begins after this initial polymerization step without a significant increase in volume. Upon further heating of the reaction intermediate, additional epoxy monomers diffuse into the clay gallery and polymerize. Phase segregation of the polymer formed with the clay tactoid generates interfaces between polymer-clay tactoid aggregate and a powder is formed. Consequently, each nanocomposite particle consists of an exfoliated clay tactoid embedded in a polyether matrix. When preparing polymer nanocomposites using an epoxy additive, the epoxy will form this powdered nanocomposite with the clay, if they are in contact at elevated temperature (150° C.) for longer than 10 minutes. Mixing matrix polymer, clay, and epoxy followed by raising the temperature above the polymer Tg, would often result in only an epoxy/clay nanocomposite surrounded by the matrix polymer. As a powder, the epoxy does not aid the matrix polymer in entering the clay layers, so the result is a two phase mixture of matrix polymer and an epoxy-clay nanocomposite. However, heating the matrix polymer above its glass transition temperature, followed by addition of epoxy and clay allows the formation of a clay hybrid of the three components.

Hybrid formation has been described by mass transport of the polymer melt into interlayers of the individual silicate layers. In other words, the polymer penetrates the primary particle as a flow front, leaving behind completely intercalated or exfoliated crystallites. Epoxy monomer increase the interlayer spacing thus facilitating polymer penetration into the external edge of the clay. There are two important factors contributing to the exfoliation and homogeneous dispersion of clay layers.

The first is the intercalation capability of the epoxy monomer in the clay layers and the second is the miscibility of the epoxy with the polymer. When both conditions are met, almost completely exfoliated or intercalated hybrids can form. The first stage of this process is the epoxy intercalation between the layers of the clay, through hydrogen bonding between the epoxy and the silicate layers. The interlayer spacing of the clay increases, resulting in a weakening of the interaction between the layers. This leads to improved dispersion. Epoxy will typically form an exfoliated composite, however, when used in a small amount with respect to the amount of clay in the system, the epoxy is only capable of swelling the clay layers.

For example 20 parts of epoxy per hundred parts of clay (pph) resulted in a shift of 2θ from 5.5° to 4.7° which is a change in the d-spacing from about 1.6 nm to about 1.9 nm or an increase of 0.3 nm. Therefore the epoxy alone does not exfoliate the clay and the nanocomposite structure can be attributed to the presence of polymer within the clay layers. To illustrate that almost any polymer can form a nanocomposite on the addition of a swelling (exfoliating) agent, a variety of polymers were used, including rubbers and thermoplastics of varying molecular weight.

X-ray diffraction, XRD, is used to identify the nanocomposite structure. A shift in the clay peak indicates an intercalated structure, while its absence, or decreased peak area indicates an exfoliated structure. The percent of intercalation/exfoliation is calculated from x-ray diffraction patterns using the equation: 100-[(clay peak area with epoxy)/(clay peak area without epoxy) ★100].

Both intercalated and exfoliated samples have been prepared, the structure being dependent on the polymer used. Table I list each polymer, percent intercalation/exfoliation, molecular weight, and the type of nanocomposite formed. X-ray reflections show that some matrix polymers broaden the clay peak in the absence of epoxy, suggesting they are capable of swelling the clay forming an intercalate. With an exfoliated structure, there is no doubt that the exfoliation of the clay is due to the presence of the matrix polymer within the clay. X-ray diffraction, XRD, of the epoxy-clay composite, 20 pph epoxy, showed intercalation of the epoxy monomer. Therefore on intercalates a separate determination is needed to confirm that there is polymer within the clay layers. Examples of polymers that intercalate in the presence and in the absence of epoxy include poly(butyl methacrylate) and poly(ethylene glycol). With these matrix polymers intercalation without epoxy results in two reflection peaks, one characteristic of non-intercalated clay and one characteristic of intercalated clay. On addition of epoxy to these nanocomposites the peak for non-intercalated clay decreased and the peak area for intercalated clay decreased. However the separation of the clay layers in the newly formed x-ray reflections was characteristic of the particular matrix polymer rather than the epoxy-clay intercalates indicating more uniform distribution of the matrix polymer in all the clay layers was being achieved by the addition of epoxy rather than forming a separate simple epoxy-clay interclate.

TABLE I

Nanocomposites Formed

| Sample # | Polymer | Percent Formation % | Molecular weight/1000 | Structure with 10 wt. % B12, 2 wt. % Epoxy |
|---|---|---|---|---|
| 1 | Poly(ethyl methacrylate) | 50 | 515 | exfoliated |
| 2 | Poly (isobutylene) | 39 | 500 | exfoliated |
| 3 | Poly (1-butadiene) | 23 | 420 | exfoliated |
| 4 | Poly (isoprene) | 26 | 410 | exfoliated |
| 5 | Poly (butyl methacrylate) | 66 | 337 | intercalated |
| 6 | Poly (chloroprene) | 81 | 188 | exfoliated |
| 7 | Poly (1-butene) | 26 | 185 | exfoliated |
| 8 | Poly (styrene-acrylonitrile) | 85 | 185 | intercalated |
| 9 | Poly (octadecyl methacrylate) | 0 | 170 | intercalated |
| 10 | Poly (ethylene) | 68 | 125 | intercalated |
| 11 | Poly (methyl methacrylate) | 50 | 120 | exfoliated |

TABLE I-continued

Nanocomposites Formed

| Sample # | Polymer | Percent Formation % | Molecular weight/1000 | Structure with 10 wt. % B12, 2 wt. % Epoxy |
|---|---|---|---|---|
| 12 | Poly (vinyl acetate) | 70 | 60 | exfoliated |
| 13 | Poly (styrene) | 54 | 45 | exfoliated |
| 14 | Poly (carbonate) | 64 | 29 | exfoliated |
| 15 | Poly (caprolactone) | 54 | 15 | exfoliated |
| 16 | Poly (ethylene glycol) | 82 | 10 | intercalated |
| 17 | Poly (vinyl alcohol) | 80 | 2 | exfoliated |
| 18 | Poly (tetrafluoroethylene) | 89 | unknown | exfoliated |
| 19 | Poly (propylene) | 77 | unknown | intercalated |
| 20 | Poly (amide) Nylon 12 | 99 | unknown | exfoliated |
| 21 | Poly (vinyl chloride) | 100 | unknown | exfoliated |
| 22 | Poly (oxymethylene) | 70 | unknown | exfoliated |

Matrix polymers such as poly(styrene-acrylonitrile), polypropylene, polyethylene do not intercalate in the absence of epoxy. The XRD peaks for these intercalates appear at 2θ=5.0° and 2θ=3.5°. As previously mentioned, the d-spacing of B12 is 1.6 nm and on addition of 20 pph of epoxy, 17 weight percent, the clay swells by 17% to a d-spacing of 1.9 nm. The intercalated peak in the PSAN sample has a d-spacing of 2.5 nm, which is a 34% increase beyond that produced by swelling clay with epoxy, and a 57% increase in interlayer spacing over B12. To increase the interlayer spacing of the silicate clay beyond the maximum attributed to the epoxy, requires the presence of polymer within the clay.

The difference in the structures and physical properties of such a wide range of matrix materials has lead to different trends in the ability of these polymers to form nanocomposites. However, the structure of the resultant composite is dependent upon the polymer used, namely its molecular weight and molecular structure. As mentioned above, the epoxy monomer simply swells the clay, however, the polymer must diffuse into the clay layers. Consequently, the intercalated peak area increases. With a material such as poly(styrene-acrylonitrile) this becomes more difficult, and takes longer if the polymer has a high molecular weight, high viscosity, or high degree of crosslinking. For example, poly(isobutylene) has a molecular weight of 500,000 and 39% exfoliation is calculated from the XRD data. Poly(ethyl methacrylate) has a similar molecular weight, 515,000, but shows 50% exfoliation because it flows more easily.

All the polymers used in this study show some additional degree of intercalation/exfoliation on addition of epoxy. Whether the final structure is intercalated or exfoliated depends on the molecular structure of the polymer, specifically the ability of the polymer to bind with the clay. There are many possible interactions occurring at the polymer-clay interface. The polymer may bind directly to the siloxane-oxygen clay layers, or the alkylammonium chains may "dissolve" to different degrees into the polymer matrix. Binding of the hydroxylated edges of the silicate layer with the polymer matrix is also possible. Polymers containing polar functional groups are capable of binding to the clay layers as the polymer flow front moves through the clay. As a result, the interlayer interactions are weakened and the clay layers are dispersed. Polymers without such functional groups do not bind with the clay, so as the front moves through, the clay expands, but there is no dispersion of the layers. Therefore, polymers that lack functional groups capable of interacting with the clay tend to result in an intercalated structure. For example the polymers polypropylene, polyethylene, poly(ethylene glycol), poly (styrene-acrylonitrile), poly(butyl methacrylate), and poly (octadecyl methacrylate) all yield intercalated nanocomposites. However poly(octadecyl methacrylate) exhibits a higher degree of intercalation in the absence of the exfoliating agent.

Polypropylene, polyethylene, and poly(styrene-acrylonitrile) show two peaks by x-ray diffraction, due to incomplete intercalation. On addition of higher concentrations of epoxy, the peak intensity of the intercalated material increases, while the intensity of the original clay peak decreases indicating complete intercalation and eventual exfoliation at higher concentrations of epoxy. In a separate experiment increasing the concentration of epoxy in a blend of poly(1-butene) and B12 clay resulted in increases in the degree of exfoliation. On going from 2 wt. % epoxy to 5 or 10 wt. % epoxy the degree of exfoliation went from 26% to 87% and 87% respectively. Therefore an increase in the epoxy concentration can increase the degree of exfoliation if the clay is not essentially exfoliated.

Aside from using higher epoxy concentration, hybrid formation can be increased by changing the surfactant (e.g. alkylammonium ion). An attractive feature of nanocomposite has always been the ease of surface modification of the clay in this manner. Finding a cation with a structure similar to the polymer matrix facilitates the hybrid nanocomposite formation. Poly(octadecyl methacrylate) intercalates into B12 clay to a greater extent in the absence of epoxy, however, in both samples there remains a sizable peak corresponding to the original clay, even on the addition of epoxy. With B12, there is not any additional intercalation resulting from the addition of epoxy. Using B16, the size of the original clay peak is decreased, and 56% of the clay is intercalated by the polymer.

The type of polymer used, and its molecular weight tend to dictate the degree of exfoliation achieved. The low molecular weight materials (MW<150,000) vary in degree of nanocomposite formation. Neither rubbers nor high molecular weight samples result in a high degree of exfoliation. In general, rubbers and high molecular weight polymers (MW>150,000) typically have a higher viscosity than their low molecular weight counterparts, thus impairing their ability to flow and hindering diffusion. Since mass transport into the silicate interlayer is the limiting step to hybrid formation, the degree of constituent mixing is critical for rapid hybrid formation. The samples prepared in this study to simply show the feasibility of composite formation with any matrix polymer were stirred manually 30 minutes. Although stirred manually, the reproducibility of the extent of exfoliation was within 6%.

The x-ray diffraction of bentolite clay has a diffraction angle of 5.5° indicating a d-spacing of 1.6 mm. The x-ray diffraction patterns of the mixtures of polycarbonate (PC), polyacrylate (PA), poly(styrene-acrylonitrile) (PSAN), polyethylene (PE), poly(vinyl acetate) (PVAc), nylon 12 (N12), polypropylene (PP), poly(vinyl acetate) (PVA), and poly (vinyl chloride) (PVC) with clay were examined. PC, PA, and PSAN blends showed a decrease in the crystalline reflection area with respect to the crystalline area of the bentolite reflection verifying an exfoliated structure. The diffraction patterns of PC and PSAN blends with clay, each showed a shift in the clay peak from 2θ=5.5° to 5.0°, which equates to a separation distance changing from 1.60 nm to 1.77 nm. A decrease in intensity was also observed. If the clay in these composites was completely exfoliated, the clay reflection would be absent. Its presence suggests agglomerates of clay in the sample. The shift in the clay reflection peak, however, indicates an increase in d-spacing suggesting penetration of the clay layers by these organic materials. As a material exfoliates the clay, there is an initial penetration of the clay galleries, followed by complete disruption of the layers. Therefore, tracking exfoliation by x-ray would show an initial shift in diffraction angle, followed by a decrease in peak area. Mixing the materials for a longer period of time as well as lower clay loading may result in complete exfoliation.

The structure of the nanocomposite is related to the solubility parameter ($\delta$) of the polymer and the epoxy. The solubility parameter is a measure of the force by which molecules attract one another. When matching solubility parameter values, the effect of hydrogen bonding must be considered as well as the molecular weight. The correlation of the solubility parameter of the polymers used in this study and the resulting nanocomposite, which is produced, will allow a prediction of the final structure of the material as well as a choice of appropriate swelling agent. Table II lists the $\delta$ values of each polymer, epoxy, and $\epsilon$ caprolactam.

Blends of polypropylene or polyethylene with clay show nanocomposite formation using 2 weight percent epoxy. The general trend is that when the solubility parameter of the polymer is very different from that of epoxy ($\Delta\delta>1.8$) the nanocomposite is primarily of the intercalated type. However, intercalation is dependent on the amount of epoxy used. On addition of 5% epoxy, both polyethylene and polypropylene completely exfoliate the clay layers rather than stopping at intercalation. Since both of these polymers have a $\delta$ value very different from that of epoxy, these two components (polymer and epoxy) are immiscible or only slightly miscible, therefore, the epoxy will enter the clay layers first. Using only 2% epoxy, the layers of the clay only swell, and they do not exfoliate. However when the epoxy concentration is increased to 5 wt. %, the epoxy concentration within the clay galleries is large enough to induce exfoliation, followed by diffusion of the polymer chains.

When the $\delta$ value of a polymer is similar to that of epoxy, as in nylon 12 (N12), poly(vinyl alcohol) (PVA), polycarbonate (PC), poly(styrene-acrylonitrile) (PSAN) and polyacrylate (PA) the result is an exfoliated nanocomposite rather than transitioning first through intercalation. In this case, a small amount of the polymer is miscible with the epoxy. The epoxy enters the clay and swells the layers of the gallery. However, bulky polymer chains are mixed with this epoxy, so diffusion of the polymer into the clay disperses the clay layers throughout the matrix, yielding an exfoliated composite. Again as with the PP, increasing the percentage of epoxy added to the system can increase the degree of swelling and of exfoliation. Using 5 wt. % epoxy in the poly (styrene-acrylonitrile) completely exfoliates the structure. On the addition of more monomer, more polymer is able to mix with and therefore enter the clay swelling of the clay galleries, allowing easier diffusion of additional polymer chains therein.

The amount of polymer intercalating in the clay and the degree of exfoliation depends on additional factors other than $\delta$. Poly (styrene-acrylonitrile) has a $\delta$ value closer to epoxy than does polyacrylate, however polyacrylate has a higher degree of exfoliation. Such a result can be attributed to increased hydrogen bonding in the polyacrylate.

Poly(vinyl acetate) has a solubility parameter ($\delta$) very close to epoxy, yet not identical. Poly(vinyl acetate), due to the similar $\delta$, is capable of partially exfoliating the clay without the presence of epoxy. However, since they have such similar solubilities, on mixing with epoxy monomer, a large fraction of the polymer is miscible with the epoxy. Therefore, when trying to enter the clay layers, a large steric hindrance is created which inhibits entry of both the epoxy and polymer into the very small (nonswollen) clay galleries. As a result, neither material is able to enter and there is no significant intercalation or exfoliation.

If $\epsilon$-caprolactam ($\delta=10.3$) is used as the exfoliating material for a poly(vinyl acetate)-clay mixture an exfoliated nanocomposite can be formed. In this case, the $\delta$ values are sufficiently different so that the $\epsilon$-caprolactam can selectively enter and swell the clay, followed by diffusion of the poly(vinyl acetate).

Poly(vinyl chloride), PVC, has a solubility parameter identical to epoxy, allowing an exfoliated composite to be prepared with or without the addition of epoxy. It can form a composite in the presence of epoxy while PVAc cannot, because epoxy and PVC are completely miscible and have the same affinity for the clay. Therefore the PVC and epoxy disperse the clay layers together. In PVAc, the polymer is mostly dissolved in the epoxy, but there are domains of bulky polymer, with lower affinity for the clay, trying to disperse the layers at the same time as the epoxy, and as mentioned above, this results in no composite formation.

While PVC can exfoliate a clay with or without epoxy, the PVC visibly degrades during composite preparation without the added epoxy. At a temperature of 170° C., the polymer will soften and can be stirred. When the clay is added and exfoliation begins, the polymer quickly turns purple, then black. The thermal decomposition of PVC is characterized by the release of hydrogen chloride. The dehydrochlorination proceeds quickly, resulting in the formation of conjugated double bonds in the PVC molecule. If the PVC/clay blend contains epoxy, thermal degradation is not observed at the same mixing temperature. This suggests that either the clay surface or the exchange cation is initiating the polymer degradation. On addition of epoxy, these components (clay surface and exchange cation) are coated with the epoxy and direct contact with the PVC is avoided. This inhibits the PVC degradation, allowing the preparation of a useful nanocomposite.

The addition of clay to the polymers would be expected to increase the thermal stability of the polymers (measured as the temperature at which a 10% cumulative weight loss occurs) due to the high thermal stability of the clay. This was not observed experimentally. The lack of thermal stability cannot be attributed to the type of composite (presence of intercalation or exfoliation). The degree of exfoliation may play a role in the heat resistance.

Exfoliated composites have been prepared with sixteen different polymers using 2 wt. % epoxy and a clay loading of 10 wt. %. A decrease in the clay reflection peak indicated the dispersion of the clay in the polymer matrix. While exfoliation was not always complete, a lower clay loading, longer reaction time, and higher epoxy concentration may result in completely exfoliated clay structures. Thus compounds with appropriate $\delta$ values can significantly enhance the ability to intercalate polymers into clay and/or exfoliate the clay sheets.

TABLE II

Solubility Parameter and X-ray Peak Areas of Composites

| Sample | $\delta(Cal/cm^3)^{1/2}$ | X-ray Peak Areas 2 wt. % epoxy | X-ray Peak Areas 0 wt. % epoxy | Ratio |
|---|---|---|---|---|
| Polypropylene | 7.4 | 4100.8 | 1189.8 | 3.45 |
| Polyethylene | 8.0 | 2660.0 | 2324.9 | 1.14 |
| Nylon 12 | 9.2 | 576.7 | 3799.7 | 0.15 |
| Poly(vinyl acetate) | 9.6 | 1666.4 | 1178.1 | 1.41 |
| Poly(vinyl chloride) | 9.9 | 0 | 0 | 0 |
| Poly(vinyl acetate) | 10.6 | 372.9 | 859.0 | 0.43 |
| Poly(carbonate) | 10.7 | 1419.0 | 7259.6 | 0.19 |
| Poly(styrene—acrylonitrile) | 10.8 | 2620.6 | 4489.2 | 0.58 |
| Polyacrylate | 11.3 | 12.16 | 3695.9 | 0.33 |
| Epoxy | 9.9 | — | — | |
| ε-caprolactam | 10.3 | — | — | |

The blends of polymer, swelling agent, and sheet silicate or sheet silicone are useful as a molding material to make molded or extruded articles.

While in accordance with the Patent Statutes, the best mode and preferred embodiment have been set forth, the scope of the invention is not limited thereto, but rather by the scope of the attached claims.

What is claimed is:

1. A nanocomposite comprising;
    a) from about 1 to about 70 weight percent of a sheet silicate or sheet silicone filler optionally surface treated characterized by a platelike structure with each plate having a thickness from about 1 to about 30 nanometers,
    b) from about 30 to about 99 weight percent of a matrix polymer, and
    c) from about 0.05 to about 20 weight percent of a swelling agent, wherein said swelling agent is epoxy or caprolactam or a combination thereof, or a dimer, a trimer, or oligomer of four or more repeat units, or a polymer of said epoxy or said caprolactam, or combinations thereof, wherein said weight percents are based on the weight of the blend of matrix polymer, swelling agent, and sheet silicate or sheet silicone, and wherein said swelling agent is neither a monomeric nor an oligomeric form of the matrix polymer, wherein said swelling agent is neither water nor a low boiling temperature, non reactive solvent, and wherein said swelling agent has a solubility parameter such that it facilitates entry of said matrix polymer into said filler thereby increasing the amount of intercalation or increasing the exfoliation more than 5 percent over a similar control without the swelling agent.

2. A nanocomposite according to claim 1, wherein said matrix polymer is inserted into said filler to an extent such that 1) the spacing between said platelike structure in said composite is greater than the inherent spacing between said platelike structure of said filler with only said swelling agent or 2) at least 10 weight percent more of said filler is exfoliated in said nanocomposite as compared to a simple blend of said filler and said matrix polymer.

3. A nanocomposite according to claim 1, wherein said filler is present from about 5 to about 50 weight percent, said swelling agent is present form about 0.5 to about 15 weight percent and said matrix polymer is present from about 35 to about 94.5 weight percent.

4. A nanocomposite according to claim 1, wherein said filler is present from about 5 to about 30 weight percent, said swelling agent is present from about 1 to about 15 weight percent, and said matrix polymer is present from about 55 to about 94 weight percent.

5. A nanocomposite according to claim 1, wherein said filler comprises clay.

6. A nanocomposite according to claim 1, wherein said matrix polymer is incapable of intercalating or exfoliating more than 5 weight percent of said filler in a simple blend of liquid matrix polymer and filler.

7. A process for preparing a nanocomposite comprising; blending at least
    a) from about 1 to about 70 weight percent of a sheet silicate or sheet silicone filler characterized by a platelike structure with each plate being from about 1 to about 30 nanometers in thickness,
    b) from about 30 to about 99 weight percent of a matrix polymer, and
    c) from about 0.05 to about 20 weight percent of a swelling agent, wherein said swelling agent is epoxy, caprolactam, or combinations thereof, or a dimer, a trimer, or oligomer of four or more repeat units, or a polymer of said epoxy or said caprolactam, or combinations thereof, wherein said swelling agent is neither a monomer which is present in said matrix polymer as a repeating unit nor an oligomer having the same primary repeating unit as said matrix polymer, wherein said swelling agent is neither water nor a low boiling temperature, nonreactive solvent, and wherein said swelling agent has a solubility parameter such that it facilitates entry of said matrix polymer into said filler thereby increasing the amount of intercalation or increasing the exfoliation more that 5 percent over a similar control without the swelling agent, and wherein said weight percents are based on the total weight of said swelling agent, said matrix polymer and said sheet silicate of sheet silicone.

8. A process according to claim 7, wherein said filler is present from about 5 to about 50 weight percent, said swelling agent is present from about 0.5 to about 15 weight percent and said polymer is present from about 35 to about 94.5 weight percent.

9. A process according to claim 7, wherein said filler is present from about 5 to about 30 weight percent, said swelling agent is present from about 1 to about 15 weight percent, and said polymer is present from about 55 to about 94 weight percent.

10. A process according to claim 7, wherein said filler comprises clay with or without surface treatment.

11. A process according to claim 7, wherein said polymer is 1) at least 90 weight percent repeating units from polymerizing one or more monoolefins or vinyl acetate monomers, 2) at least 50 weight percent repeating units from polymerizing one or more conjugated diene having 4 to 8 carbon atoms or vinyl aromatic having from 8 to 12 carbon atom monomers, or 3) a polyester or polyamide.

12. A process according to claim 7, wherein said matrix polymer is incapable of intercalating or exfoliating more than 5 weight percent of said filler in a simple blend of liquid matrix polymer and filler.

13. A reaction product comprising a melt blend of at least
    a) from about 1 to about 70 weight percent of a sheet silicate or sheet silicone filler characterized by a platelike structure with each plate being from about 1 to about 30 nanometers in thickness,
    b) from about 0.05 to about 20 weight percent of an epoxy or caprolactam swelling agent, or a dimer, a trimer, or oligomer of four or more repeat units, or a polymer of said epoxy, or said caprolactam or combinations thereof, and c) from about 30 to about 99 weight percent of a matrix polymer, wherein said swelling agent is not an oligomer or polymer having the same primary repeating unit as said matrix polymer, and wherein said weight percents are based on the total weight of said swelling agent, said matrix polymer and said sheet silicate or sheet silicone.

\* \* \* \* \*